United States Patent
Adachi et al.

(10) Patent No.: US 10,403,253 B2
(45) Date of Patent: Sep. 3, 2019

(54) PORTABLE RECORDING/REPRODUCING APPARATUS WITH WIRELESS LAN FUNCTION AND RECORDING/REPRODUCTION SYSTEM WITH WIRELESS LAN FUNCTION

(71) Applicant: TEAC Corporation, Tokyo (JP)

(72) Inventors: Shigeyuki Adachi, Tokyo (JP); Takeshi Ushikubo, Tokyo (JP)

(73) Assignee: TEAC CORPORATION, Tokyo (JP)

( * ) Notice: Subject to any disclaimer, the term of this patent is extended or adjusted under 35 U.S.C. 154(b) by 0 days.

(21) Appl. No.: 14/971,764

(22) Filed: Dec. 16, 2015

(65) Prior Publication Data
US 2016/0180825 A1 Jun. 23, 2016

(30) Foreign Application Priority Data

Dec. 19, 2014 (JP) ................................. 2014-257233
Dec. 26, 2014 (JP) ................................. 2014-264731

(51) Int. Cl.
*G06F 17/00* (2019.01)
*G10H 1/00* (2006.01)
(Continued)

(52) U.S. Cl.
CPC ............. *G10H 1/0083* (2013.01); *G10H 1/46* (2013.01); *G11B 20/10527* (2013.01); *G10H 2240/211* (2013.01); *G11B 2020/10546* (2013.01)

(58) Field of Classification Search
CPC .. G10H 1/0083; G10H 1/46; G10H 2240/211; G11B 20/10527; G11B 2020/10546
(Continued)

(56) References Cited

U.S. PATENT DOCUMENTS 4,893,199 A * 1/1990 Okada ............... G11B 20/10527
360/32
7,471,988 B2 * 12/2008 Smith .................. G11B 27/034
381/77
(Continued)

FOREIGN PATENT DOCUMENTS

JP 59-17049 U 2/1984
JP 05-344594 A 12/1993
(Continued)

OTHER PUBLICATIONS

"Convenient WiFi with many functions; Hope for realization of voice monitoring in real time," *Video Salon* 68(7):77, 2014. (with English Excerpts) (4 pages).
(Continued)

*Primary Examiner* — Paul C McCord
(74) *Attorney, Agent, or Firm* — Seed IP Law Group LLP

(57) ABSTRACT

There are provided portable recording/reproducing apparatus and a recording/reproducing system that have a wireless LAN function capable of setting sound record parameters and playback parameters by remote operation.
The recording/reproducing apparatus has a Wi-Fi module and establishes Wi-Fi connection with a smartphone, and the like. Having established the Wi-Fi connection with the smartphone, the recording/reproducing apparatus receives setting values of the sound record parameters and those of the playback parameters from the smartphone, and reproduces the audio signal by use of the setting values. The smartphone acquires the setting values of the sound record parameters and the playback parameters by way of the Internet, and transmits the setting values to the recording/reproducing apparatus.

9 Claims, 9 Drawing Sheets

(51) Int. Cl.
*G11B 20/10* (2006.01)
*G10H 1/46* (2006.01)

(58) Field of Classification Search
USPC .......................................................... 700/94
See application file for complete search history.

(56) References Cited

U.S. PATENT DOCUMENTS

| | | | | |
|---|---|---|---|---|
| 8,525,012 | B1* | 9/2013 | Yang | G10H 1/08 700/94 |
| 8,724,600 | B2* | 5/2014 | Ramsay | G06F 17/30017 370/236 |
| 8,874,621 | B1* | 10/2014 | Goodwin | G06F 17/30292 707/756 |
| 8,892,225 | B2* | 11/2014 | Walsh | H04H 40/18 455/141 |
| 9,094,636 | B1* | 7/2015 | Sanders | H04N 5/4403 |
| 9,111,519 | B1* | 8/2015 | Yang | G10H 1/40 |
| 9,319,738 | B2* | 4/2016 | Li | H04N 21/4363 |
| 2004/0117859 | A1* | 6/2004 | Ohel | H04M 1/6505 725/146 |
| 2004/0171377 | A1* | 9/2004 | Engstrom | G06Q 30/02 455/419 |
| 2005/0130717 | A1* | 6/2005 | Gosieski, Jr. | H04L 29/06027 455/575.2 |
| 2007/0022055 | A1* | 1/2007 | Eliason | G06F 21/10 705/51 |
| 2007/0078768 | A1* | 4/2007 | Dawson | H04N 7/17318 705/50 |
| 2007/0250194 | A1* | 10/2007 | Rhoads | G06Q 30/00 700/94 |
| 2008/0033582 | A1* | 2/2008 | Drel | G11B 27/034 700/94 |
| 2008/0045140 | A1* | 2/2008 | Korhonen | H04M 1/7253 455/3.06 |
| 2008/0077261 | A1* | 3/2008 | Baudino | H04H 20/63 700/94 |
| 2008/0249644 | A1* | 10/2008 | Jehan | G11B 27/038 700/94 |
| 2009/0254960 | A1* | 10/2009 | Yarom | G06F 17/30781 725/115 |
| 2010/0034257 | A1* | 2/2010 | Sedeffow | H04L 65/605 375/240.01 |
| 2010/0087937 | A1* | 4/2010 | Tolson | G10H 3/188 700/94 |
| 2010/0093364 | A1* | 4/2010 | Ribeiro | H04W 72/082 455/452.2 |
| 2010/0097473 | A1* | 4/2010 | Park | H04N 5/23203 348/159 |
| 2010/0118162 | A1 | 5/2010 | Saijo | |
| 2010/0217414 | A1 | 8/2010 | Sanders et al. | |
| 2012/0065753 | A1* | 3/2012 | Choo | G10L 19/18 700/94 |
| 2012/0179833 | A1* | 7/2012 | Kenrick | H04N 21/234309 709/231 |
| 2012/0300015 | A1* | 11/2012 | Chen | H04N 7/152 348/14.08 |
| 2012/0314693 | A1* | 12/2012 | Medapalli | H04W 40/02 370/338 |
| 2013/0261777 | A1* | 10/2013 | Woodman | H04N 21/233 700/94 |
| 2014/0055251 | A1 | 2/2014 | Son et al. | |
| 2014/0178039 | A1* | 6/2014 | Sekiguchi | G11B 27/322 386/241 |
| 2014/0341109 | A1* | 11/2014 | Cartmell | H04L 45/308 370/328 |
| 2014/0354837 | A1 | 12/2014 | Okazaki et al. | |
| 2014/0369331 | A1* | 12/2014 | Goto | H04L 67/16 370/338 |
| 2015/0273322 | A1* | 10/2015 | Nakagawa | G06F 3/016 463/37 |
| 2016/0337190 | A1* | 11/2016 | Wachter | H04W 76/10 |
| 2018/0070349 | A1* | 3/2018 | Huang | H04W 72/048 |

FOREIGN PATENT DOCUMENTS

| | | |
|---|---|---|
| JP | 2000-276195 A | 10/2000 |
| JP | 2001-292442 A | 10/2001 |
| JP | 2005-39466 A | 2/2005 |
| JP | 2006-246418 A | 9/2006 |
| JP | 2006-352188 A | 12/2006 |
| JP | 2009-188459 A | 8/2009 |
| JP | 2010-114522 A | 5/2010 |
| JP | 2010-212774 A | 9/2010 |
| JP | 2014-49776 A | 3/2014 |
| JP | 2014-71226 A | 4/2014 |
| JP | 2014-179845 A | 9/2014 |
| JP | 2014-226235 A | 12/2014 |
| WO | 2013/137357 A1 | 9/2013 |
| WO | 2014/354837 A1 | 7/2014 |

OTHER PUBLICATIONS

"Remote control of signal input level in sound recording systems," *SONY Public Technical Report* 8(8), 1999. (With English Excerpts) (5 pages).

\* cited by examiner

PORTABLE RECORDING/REPRODUCING APPARATUS WITH WIRELESS LAN FUNCTION AND RECORDING/REPRODUCTION SYSTEM WITH WIRELESS LAN FUNCTION

PRIORITY INFORMATION

This application claims priority to Japanese Patent Application Nos. 2014-257233 filed on Dec. 19, 2014 and 2014-264731 filed on Dec. 26, 2014, which are incorporated herein by reference in their entireties.

FIELD

The present invention relates to a portable recording/reproducing apparatus and a recording/reproducing system and, and more particularly, to a portable recording/reproducing apparatus with a wireless LAN function and a recording/reproducing system with a wireless LAN function.

BACKGROUND

A method employed in an existing recording/reproducing apparatus to define recording conditions is to display a setting screen from menu items and perform setting by operating a GUI (Graphical User Interface) of the recording/reproducing apparatus or to display the setting screen on a monitor, a TV, or the like, by remote control operation.

However, since the portable recording/reproducing apparatus cannot display the setting screen on the monitor or the TV, the apparatus is restricted in terms of remotely-operable functions, such as a record start and a record stop. In reality, however, difficulty is encountered in setting sound record parameters through remote operation.

JP H05-344594 A states a method for setting preset values in an acoustic signal processing apparatus with a recording/reproducing function. It states previously recording a plurality of preset values (setting parameters) in detachable data memory; setting the data memory in an apparatus main body when needed; and reading and setting necessary parameters from among the plurality of setting parameters.

JP 2010-114522 A states a method for setting preset information in a camera control apparatus which controls a plurality of cameras by being connected to the cameras. It states preliminarily letting both the cameras and the camera control apparatus retain a plurality of pieces of respective different preset information; and reflecting the preset information retained in the camera control apparatus on all the cameras or reflecting the preset information read from a specified camera onto the other cameras.

JP2001-292442 A states a surveillance camera system that enables indoor surveillance from a distance by use of a telephone equipped with image display means.

JP 2006-246418 A states a surveillance camera system that enables a portable terminal to operate a plurality of surveillance cameras and personal computers on a construction site, and others.

Suppose a portable recording equipment records music in a live concert involving performance of a plurality of bands. A variety of sound record parameters are set each time in rehearsal or on stage, and the portable recording apparatus is placed at an appropriate location. When remote control is available, start and stop of recording are remotely performed.

However, there are desires to change a recording level and change a sound recording format because sound volume varies depending on the bands. In order to cope with these desires, there is no alternative but to place the portable recording apparatus at a location where the apparatus can be easily operated. Even when remote operation of the recording apparatus is available, there still remains a dilemma of difficulty in placing the recording apparatus at an optimum location.

Accordingly, desires have existed for techniques that enable positioning of the portable recording/reproducing apparatus at an optimum location and easy setting of sound record parameters in the recording/reproducing apparatus by remote operation. The same also applies to playback parameters.

Also, the recording/reproducing apparatus for recording and reproducing an audio signal having a wireless LAN function recently came on the market. In one use application of the recording/reproducing apparatus with the wireless LAN function, there is a need to remotely control the recording/reproducing apparatus placed at a location where a user cannot directly operate the apparatus. Examples are a case where the recording/reproducing apparatus placed, for instance, in a concert hall or a live music hall, at an elevated location where recording could not be hindered by exultant shouts of the audience, and a case where a plurality of pieces of the recording/reproducing apparatus set at various locations optimal for recording are collectively controlled.

A proposal made for such a case is to cause a widely-diffused smartphone to work as a remote controller and control the recording/reproducing apparatus remotely. However, a plurality of pieces of recording/reproducing apparatus cannot be collectively controlled.

SUMMARY

The present invention provides a portable recording/reproducing apparatus with a wireless LAN function and a recording/reproducing system with a wireless LAN function that enable setting of sound record parameters and playback parameters by remote operation.

Further, the present invention provides a portable recording system with a wireless LAN system that enables efficient recording of an audio signal by collective control of a plurality of pieces of recording apparatus located at different locations with the use of a portable device, such as a widespread smartphone, and others.

The present invention includes a wireless LAN module, an input section for inputting an audio signal, and a processing section configured so as to record the audio signal in a recording medium by use of setting values of sound record parameters. When the wireless LAN module and the portable device are wirelessly connected, the processing section receives the setting values wirelessly transmitted from the portable device and records the audio signal by use of the received setting values. In the present invention, when the wireless LAN module and the portable device are wirelessly connected, the processing section can also receive setting values of playback parameters wirelessly transmitted from the portable device and reproduce the audio signal by use of the received setting values.

Moreover, the present invention has a wireless LAN module; an input section for inputting an audio signal; memory for recording a plurality of setting values of sound record parameters; and a processing section configured so as to record the audio signal in a recording medium by use of the setting values of the sound record parameters. The processing section records the audio signal by use of the setting values selected from the plurality of setting values recorded in the memory in response to a selection command wirelessly transmitted from a portable device when the wireless LAN module and the portable device are wirelessly connected. The present invention further has second memory for recording a plurality of setting values of playback parameters. When the wireless LAN module and the portable device are wirelessly connected, the processing section can also reproduce the audio signal by use of the setting values selected from the plurality of setting values recorded in the second memory in response to a selection command wirelessly transmitted from a portable device.

The present invention has a wireless LAN module, an input section for inputting an audio signal, memory for recording setting values of sound record parameters, and a processing section configured so as to record the audio signal in a recording medium by use of the setting values of the sound record parameters. When the wireless LAN module and the portable device are wirelessly connected, the processing section reads the setting values recorded in the memory in response to a command wirelessly transmitted from a portable device; wirelessly transmits the setting values to the portable device; receives adjusted setting values wirelessly transmitted from the portable device; and records the audio signal by use of the received, adjusted setting values. The present invention further has second memory for recording setting values of playback parameters. When the wireless LAN module and the portable device are wirelessly connected, the processing section can also read the setting values recorded in the second memory in response to a command wirelessly transmitted from a portable device; wirelessly transmit the setting values to the portable device; receive adjusted setting values wirelessly transmitted from the portable device; and reproduce the audio signal by use of the received, adjusted setting values.

The present invention also provides a recording/reproducing system made up of a portable recording/reproducing apparatus and a portable device, and the portable recording/reproducing apparatus has a wireless LAN module, an input section for inputting an audio signal, and a processing section configured so as to record the audio signal in a recording medium by use of the setting values of the sound record parameters. When the wireless LAN module and the portable device are wirelessly connected, the processing section receives the setting values wirelessly transmitted from the portable device and records the audio signal by use of the received setting values. In the present invention, when the wireless LAN module and the portable device are wirelessly connected, the processing section can also receive setting values of the playback parameters wirelessly transmitted from the portable device and reproduce the audio signal by use of the received setting values.

In one embodiment of the present invention, the portable device acquires the setting values by way of the Internet.

According to the present invention, sound record parameters can be easily set by remote operation. Accordingly, optimal sound record parameters can be set from a distance in accordance with a recording target and an environment while the portable recording/reproducing apparatus is placed at a desired location. Hence, recording quality can be enhanced. The same also applies to playback parameters, and optimal playback parameters can be set from a distance.

Moreover, the present invention provides a sound recording system having a wireless LAN function, and the sound recording system is made up of a portable device and a plurality of pieces of sound recording apparatus having respective wireless LAN functions. Each of the plurality of pieces of recording apparatus has a first wireless LAN module, an input section for inputting an audio signal, an A/D conversion section for converting the audio signal into a digital signal, and a first processing section configured so as to act as either an access point or a client of a wireless LAN, to process a digital audio signal, and to record the processed signal into a recording medium. Any of the plurality of pieces of recording apparatus acts as an access point and remaining recording apparatus operate as clients. The portable device can set the second wireless LAN module and the second wireless LAN from a distance.

In addition, the present invention provides a sound recording system having a wireless LAN function, and the sound recording system is made up of a plurality of pieces of sound recording apparatus having respective wireless LAN functions and a portable device. Each of the plurality of pieces of sound recording apparatus has a first wireless LAN module; an input section for inputting an audio signal; an A/D conversion section for converting the audio signal into a digital signal; and a first processing section configured so as to operate as either an access point or a client of a wireless LAN, to process a digital audio signal, and to record the digital audio signal into a recording medium. Any of the plurality of pieces of the recording apparatus operates as an access point, and the other recording apparatus operate as clients. The portable device has a second wireless LAN module and a second processing section configured so as to wirelessly transmit a command to the plurality of pieces of recording apparatus operating as the access point, by way of the second wireless LAN module, to wirelessly receive status information, and to display the status information on a display section. The first processing section of the sound recording apparatus operating as the access point performs sound recording operation in response to the command wirelessly transmitted from the second processing section, and transmits recording-in-operation status information to the second processing section. The first processing sections of the sound recording apparatus operating as the clients perform sound recording operation in response to the command wirelessly transmitted from the second processing section byway of the first processing section of the sound recording apparatus operating as the access point, and also wirelessly transmit the recording-in-operation status information to the second processing section by way of the first processing section of the recording apparatus operating as the access point.

In one embodiment of the present invention, the first processing section of the sound recording apparatus operating as the access point sets the sound record parameters in response to the command wirelessly transmitted from the second processing section. The first processing sections of the sound recording apparatus operating as the clients set sound record parameters in response to the command wirelessly transmitted from the second processing section by way of the first processing section of the sound recording apparatus operating as the access point.

Moreover, the present invention provides a sound recording system having a wireless LAN function, and the sound recording system is made up of a plurality of pieces of sound recording apparatus having respective wireless LAN functions and a portable device. According to the present invention, the plurality of pieces of sound recording apparatus enable collective control of the plurality of pieces of sound recording apparatus and efficient recording of an audio signal by use of the portable device, such as a widespread smartphone.

The invention will be more clearly comprehended by reference to the embodiments provided below. However, the embodiments provided below are illustrative, and the scope of the invention is not limited to the embodiments.

BRIEF DESCRIPTION OF THE DRAWINGS

Preferred embodiments of the present invention will be described in detail by reference to the following drawings, wherein.

DETAILED DESCRIPTION

By reference to the drawings, embodiments of the present invention will be described hereunder by taking a portable recording/reproducing apparatus as an example. However, the embodiments provided below are illustrative and shall not be understood to limit the present invention thereto.

First Embodiment

Figure 1:
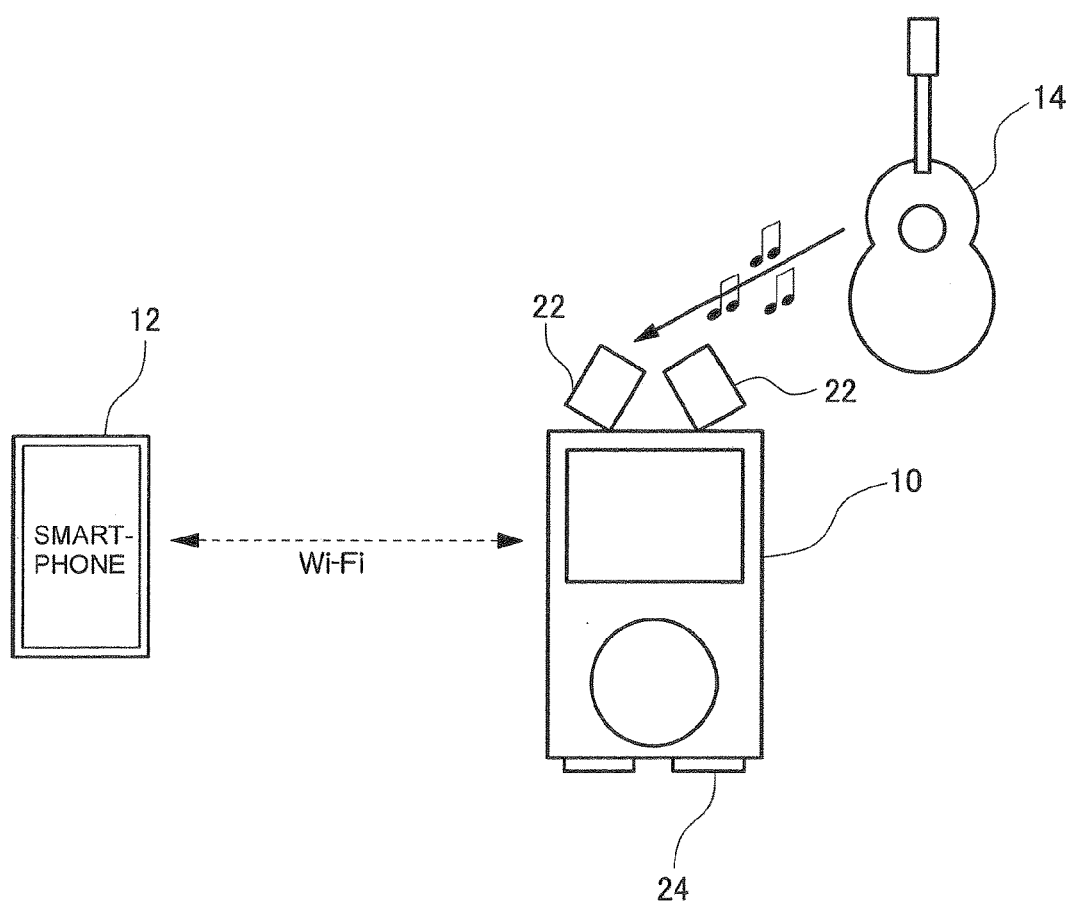
FIG. 1 is a diagram of a system configuration of a first embodiment.

FIG. 1 is a diagram of a system configuration of a first embodiment. A portable recording/reproducing apparatus (hereinafter referred to simply as a "playback device") 10 is wirelessly connected to a portable device having a wireless connection function. In the present embodiment, a smartphone 12 is mentioned as the portable device having a wireless connection function, and a wireless LAN, more specifically a Wi-Fi connection, is mentioned as the wireless connection. The smartphone having a Wi-Fi communication function, such as a Wi-Fi module, has already been known and is connected to the Internet by way of an access point of a wireless router, and others.

The playback device 10 has a known recording/reproducing function; processes an audio signal input from a built-in microphone 22 and a line input terminal 24 and records the processed audio signal into an SD card, etc. Further, the playback device 10 reproduces the audio signal recorded in the SD card and outputs the audio signal from a built-in speaker. In addition, the playback device 10 has a Wi-Fi module and establishes a Wi-Fi connection with the smartphone 12. The Wi-Fi connection between the playback device 10 and the smartphone 12 is basically a one-to-one connection; however, the connection may also be a one-to-many connection when necessary.

The user of the playback device 10 records an audio signal generated by playing a desired musical part or an audio signal generated by live performance of bands, etc., by inputting the audio signal to the built-in microphone 22 or the line input terminal 24 of the playback device 10. FIG. 1 shows a musical instrument 14, such as a guitar. However, the audio signal may also be an audio signal of an arbitrary part other than a guitar part; for instance, a bass guitar part, a vocal part, or a drum part. The playback device 10 inputs and records the audio signal in the recording medium, such as an SD card.

The smartphone 12 has the Wi-Fi module and is connected to the playback device 10 by the Wi-Fi connection. The user initiates the predetermined application (an application required to monitor or control the playback device 10) and controls operation of the playback device 10 by operating the application. Specifically, the smartphone 12 is caused to function as a remote controller of the playback device 10 by operating the application and instructs the playback device 10 to start and stop recording operation, playback operation, and others.

The playback device 10 processes various commands sent from the smartphone 12 by way of the Wi-Fi connection, thereby performing recording or reproducing operation in response to the command. When performing recording operation, the playback device 10 sets sound record parameters in cooperation with the smartphone 12 and performs recording operation in accordance with the sound record parameters. The sound record parameters are arbitrary parameters pertaining to recording and examples thereof can be mentioned as follows:

(1) Sound recording level,
(2) Sound recording format,
(3) Sampling frequency, and the number of quantization bits,
(4) Filtering characteristic, and
(5) Various effects processing (including limiter processing and reverberation processing).

Generally, the sound record parameters are previously recorded in memory of the playback device 10 as preset values. The audio signal is recorded by use of the parameters.

However, even if there is a desire to change sound record parameters on a per-band basis during recording of live music recording, the user will have no other way but to change the sound record parameters while viewing a setting screen displayed on a display section of the playback device 10. Thus, it will be difficult to carry out recording at an optimum position and with optimum sound record parameters.

Therefore, the present embodiment enables Wi-Fi connection of the playback device 10 to the smartphone 12, positioning of the playback device 10 at a desired location, and arbitrary setting of the sound record parameters of the playback device 10 with use of the smartphone 12 held at hand. Specific methods for setting the sound record parameters are as follows. Setting values of the sound record parameters are sent from the smartphone 12 to the playback device 10 by way of the Wi-Fi connection. A plurality of setting values of the sound record parameters are previously set in the playback device 10, and a command for selecting desirable setting values from the thus-recorded setting values is transmitted from the smartphone 12 by way of the Wi-Fi connection. The sound record parameters are previously recorded in the playback device 10, and the setting values of the sound record parameters are acquired and adjusted with the smartphone 12. The setting values of the adjusted sound record parameters are transmitted to the playback device 10 by way of the Wi-Fi connection.

FIGS. 2A to 2D are diagrammatic views showing the sound record parameters set by cooperation between the playback device 10 and the smartphone 12.

Figure 2A:
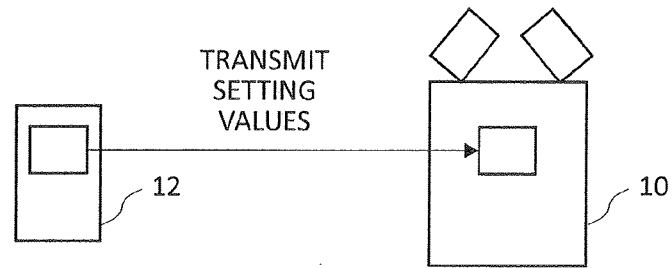
FIG. 2A is an explanatory view (Part 1) of setting record parameters in the first embodiment.

FIG. 2A is a diagrammatic view of a first method. When the playback device 10 and the smartphone 12 are connected by means of Wi-Fi connection, the user launches a predetermined application installed in the smartphone 12 to transmit setting values of the sound record parameters previously set in the application to the playback device 10. The playback device 10 stores the received setting values of the sound record parameters in the memory, performing sound recording operation by use of the stored setting values. Incidentally, even when the sound record parameters are previously set in the playback device 10, the setting values transmitted from the smartphone 12 are preferentially used. In addition to the preset values, the playback device 10 stores the setting values sent from the smartphone 12 in the memory.

Figure 2B:
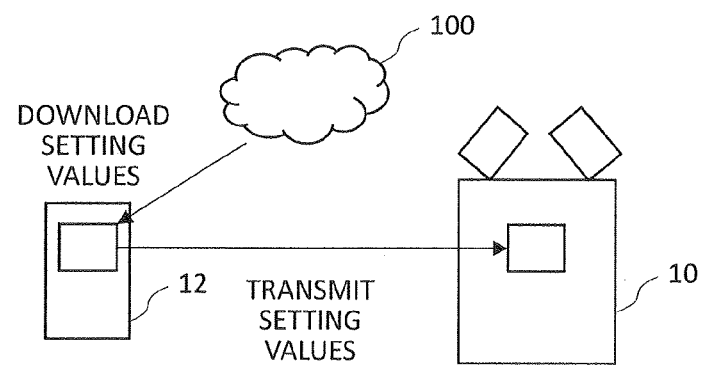
FIG. 2B is an explanatory view (Part 2) of setting the record parameters in the first embodiment.

FIG. 2B is a diagrammatic view of a second method. When the playback device 10 and the smartphone 12 are connected by means of the Wi-Fi connection, the user launches the predetermined application installed in the smartphone 12. The predetermined application makes access to a specific site of the Internet 100, acquiring the setting values of the sound record parameters by downloading, and transmitting the setting values to the playback device 10. The playback device 10 stores the received setting values of the sound record parameters into the memory, and performs sound recording operation by use of the stored setting values. In this case, the smartphone 12 does not previously need to record the sound record parameters into the memory. Further, so long as the sound record parameters are previously kept ready in the specific site of the Internet 100 for each environment where recording is to be performed with the playback device 10, the setting values of the sound record parameters suited for the environment where the playback device 10 is placed can be set in the playback device 10 by downloading. The setting values of the sound record parameters suited for the environment are, for instance, recommended setting values to be employed when rock music is to be recorded in bleachers of an AA dome,
recommended setting values to be employed when ballads are to be recorded at arena seats of a BB dome,
recommended setting values to be employed when jazz is to be recorded in a live music clubhouse, and others.

The setting values are generally determined according to a recording site or a genre of music. However, this practice does not exclusively apply to determination of the setting values. As a matter of course, the setting values can also be determined according to a band name and a name of a power music group.

Figure 2C:
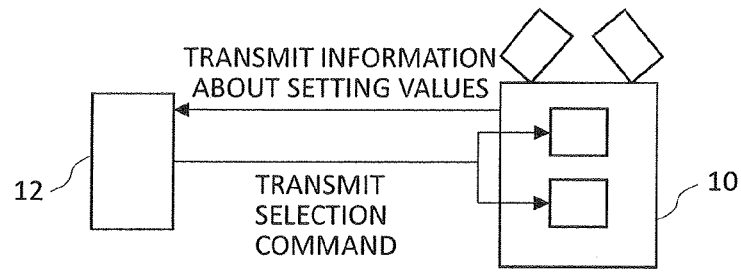
FIG. 2C is an explanatory view (Part 3) of setting the record parameters in the first embodiment.

FIG. 2C is a diagrammatic view of a third method. When the playback device 10 and the smartphone 12 are connected by means of the Wi-Fi connection, the user launches a predetermined application installed in the smartphone 12. The predetermined application makes a request to the playback device 10 for information about the setting values of the sound record parameters previously stored in the memory as preset values. In response to the request, the playback device 10 transmits the information about the setting values to the smartphone 12. Provided that a plurality of setting values, for instance, Setting values I and
Setting values II, are previously installed at preset values in the memory of the playback device 10, the playback device 10 transmits the setting values I and II to the smartphone 12. The predetermined application of the smartphone 12 receives the information about the setting values transmitted from the playback device 10, displaying the thus-received information on the screen of the smartphone 12. While viewing the screen, the user selects any of the setting values. The predetermined application transmits a selection command corresponding to a user's selection to the playback device 10. The playback device 10 receives the selection command, reads the setting value selected in accordance with the selection command, and performs sound recording operation by use of the thus-read setting value.

The setting values I and II can be at least any of a recording level, a sound recording format, a sampling frequency, a filtering characteristic, effects processing, and a combination thereof. Examples are:

Setting value I: a sound recording level=L1, and a sound recording format=way, and
Setting value II: a sound recording level=L2, and a sound recording format=mp3.

Figure 2D:
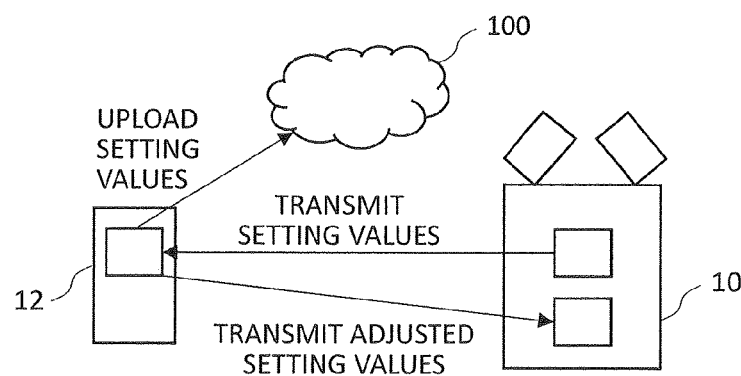
FIG. 2D is an explanatory view (Part 4) of setting the record parameters in the first embodiment.

FIG. 2D is a diagrammatic view of a fourth method. When the playback device 10 and the smartphone 12 are connected by means of the Wi-Fi connection, the user launches a predetermined application installed in the smartphone 12. The predetermined application makes a request to the playback device 10 for information about the setting values of the sound record parameters previously stored in the memory as preset values. In response to the request, the playback device 10 transmits the setting values to the smartphone 12. Provided that the setting values sent from the playback device 10 are a recording level=L2,
a sound recording format=mp3, and
a sampling frequency=48 kHz and 16 bits, the setting values are changed as follows through adjustment a recording level=L1,
a sound recording format=way, and
a sampling frequency=96 kHz and 24 bits.

After completion of user's adjustment, the predetermined application transmits the adjusted setting values obtained after setting to the playback device 10. Upon receiving the adjusted setting values, the playback device 10 records the thus-received setting values in the memory, performing recording by use of the adjusted setting values.

Further, the predetermined application of the smartphone 12 transmits the adjusted setting values to the playback device 10 and also uploads the adjusted setting values to the specific site of the Internet 100. The thus-uploaded setting values are provided for another user's use.

The methods shown in FIGS. 2A to 2D can also be used in combination as necessary. For instance, the methods shown in FIGS. 2B and 2D are combined together, and the setting values of the sound record parameters are downloaded from the specific site of the Internet 100. The user adjusts the thus-downloaded setting values to the playback device 10 by use of the predetermined application in the smartphone 12 and transmits the adjusted setting values to the playback device. Further, the user uploads the adjusted setting values to the specific site of the Internet 100. Alternatively, the methods shown in FIGS. 2A and 2C are combined together, and the smartphone 12 transmits the setting values to the playback device 10. After the playback device 10 stores the setting values in the memory, the smartphone 12 transmits a selection command, whereby any of the setting values are selectively used.

Next, a specific configuration of the playback device 10 of the present embodiment is described.

Figure 3:
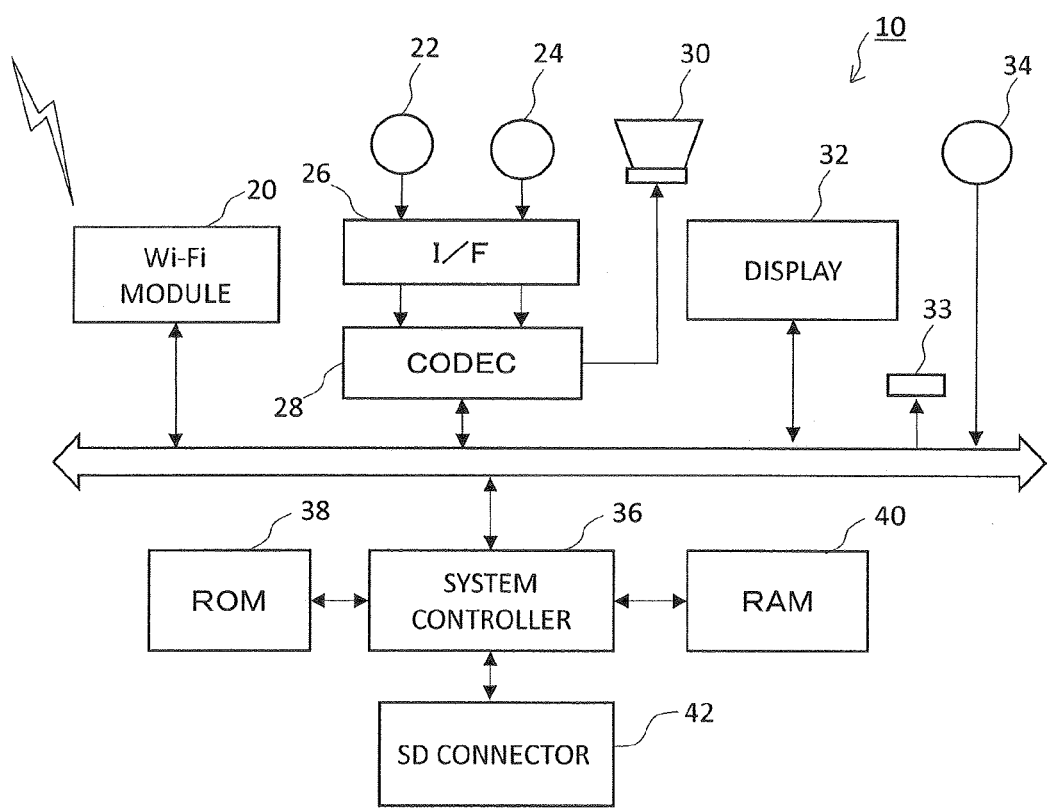
FIG. 3 is a configuration block diagram of the recording/reproducing apparatus of the first embodiment.

FIG. 3 is a configuration block diagram of the playback device 10 of the present embodiment. The playback device 10 has a Wi-Fi module 20, a built-in microphone 22, a line input terminal 24, a built-in speaker 30, a display 32, an LED 33, operation buttons 34, a system controller 36, and an SD connector 42.

The Wi-Fi module 20 is a wireless LAN module that establishes Wi-Fi connection and exchanges data with the smartphone 12. In response to operation of the operation buttons 34, the Wi-Fi module 20 establishes the Wi-Fi connection with the smartphone 12. Moreover, the Wi-Fi module 20 receives the command from the smartphone 12 and supplies the thus-received command to the system controller 36. This command is one used for controlling operation of the playback device 10; for instance, record start and record stop. Further, the Wi-Fi module 20 can also transmit status information supplied from the system controller 36 to the smartphone 12.

The built-in microphone 22 is a stereo microphone with L and R channels that inputs an audio signal, which is generated by playing a musical instrument and outputs the audio signal to an interface (I/F) 26.

The line input terminal 24 allows a line input of the audio signal from an external apparatus and outputs the audio signal to the interface (I/F) 26.

The interface (I/F) 26 outputs the audio signal received from the built-in microphone 22 or the line-input terminal 24 to a codec (CODEC) 28.

The codec (CODEC) 28 converts the input audio signal into a digital signal and supplies the signal to the system controller 36 after compressing and encoding the digital signal. The codec 28 also expands and decodes the audio signal supplied from the system controller 36, converts the thus-decoded signal into an analog audio signal, and outputs the analog audio signal from the built-in speaker 30. The codec (CODEC) 28 can also separately have a module for processing the audio signal from the built-in microphone 22 or the line input terminal 24 and another module for processing the audio signal output to the built-in speaker 30.

The display 32 is made up of an LCD panel, an organic EL panel, or the like, and displays various types of status information about the playback device 10; for instance, a record/playback time counter and a sound recording level.

The LED 33 shows a startup status and a connection status of the Wi-Fi module 20. The LED 33 stays extinguished when the Wi-Fi module 20 is OFF; stays blinking (on standby) when the Wi-Fi module 20 is ON; and stays lit up when the Wi-Fi module 20 is ON and maintains the Wi-Fi connection.

The operation buttons 34 are those used for instructing operation of the playback device 10. The operation buttons 34 include a Wi-Fi button used for switching the Wi-Fi connection between ON and OFF, a record/playback/stop button, a sound recording level adjustment button, a track selection button, and others. The operation buttons 34 can also be configured as touch buttons on the display 34. Even when the playback device 10 and the smartphone 12 are connected by means of the Wi-Fi connection and when the application of the smartphone 12 can control the operation of the playback device 10, the operation buttons 34 continue to be set in an enabled (active) state. Specifically, the system controller 36 interprets a command from the smartphone 12 and simultaneously accepts an instruction from the operation buttons 34.

The system controller 36 is made up of a processor and memory and controls individual sections of the playback device 10. In accordance with a processing program recorded in ROM 38, the system controller 36 performs various types of processing by using RAM 40 as working memory. Various types of processing include starting/stopping the Wi-Fi module 20, establishing the connection with the smartphone 12, processing the audio signal input from the built-in microphone 22 or the line input terminal 24, recording the audio signal into the SD card, reproducing the audio signal, and supplying the status information to the Wi-Fi module 20. The system controller 36 can also include a plurality of processors and work in coordination with a PLD (programmable logic device).

An SD card is inserted into the SD connector 42. The system controller 36 performs sound recording by recording the audio signal into the SD card. In addition, the system controller 36 reads the audio signal recorded in the SD card, outputting the thus-read audio signal from the built-in speaker 30 byway of the codec (CODEC) 28.

In response to the request command from the smartphone 12, the system controller 36 reads the setting values of the sound record parameters stored in the ROM 38 or the RAM 40 and transmits the setting values to the smartphone 12 by way of the Wi-Fi module 20. When the setting values of the sound record parameters are transmitted from the smartphone 12, the system controller 36 receives the setting values byway of the Wi-Fi module 20, storing the thus-received setting values into the ROM 38 or the RAM 40. Explanations are provided as follows in accordance with the methods shown in FIG. 2A to FIG. 2D.

In the cases shown in FIG. 2A and FIG. 2B, the system controller 36 receives the setting values of the sound record parameters sent from the smartphone 12, storing the thus-received setting values in the ROM 38 or the RAM 40. In order to keep the setting values valid even after the power of the playback device 10 is turned off, storing the setting values in the nonvolatile ROM 38 is desirable. Subsequently, when receiving a record start command from the smartphone 12, the system controller 36 carries out sound recording by use of the setting values of the sound record parameters stored in the memory. Specifically, the audio signal is subjected to processing in accordance with the recording level, the sound recording format, the sampling frequency, the number of bits, and the filtering characteristic that are specified by the setting values of the sound record parameters, and also to effects processing. Thus, the processed audio signal is recorded into the SD card.

In the case shown in FIG. 2C, the system controller 36 reads the setting values of the sound record parameters stored in the ROM 38 or the RAM 40 in response to the request from the smartphone 12, generates a list of the setting values, and transmits the list as setting information to the smartphone 12. When receiving the selection command transmitted from the smartphone 12, the system controller 36 reads the setting values of the sound record parameters, which are selected by the selection command, from the ROM 38 or the RAM 40. Subsequently, when receiving the record start command from the smartphone 12, the system controller 36 carries out sound recording operation by use of the thus-read setting values of the sound record parameters.

In the case shown in FIG. 2D, the system controller 36 reads the setting values of the sound record parameters stored in the ROM 38 or the RAM 40 in response to the request from the smartphone 12, transmitting the thus-read setting values to the smartphone 12. When receiving the adjusted setting values transmitted from the smartphone 12, the system controller 36 stores the setting values in the ROM 38 or the RAM 40. Subsequently, when receiving the record start command from the smartphone 12, the system controller 36 performs sound recording by use of the setting values of the sound record parameters stored in the memory.

Although the embodiment of the present invention has been described thus far, the present invention is not limited to the embodiment and is susceptible to various modifications.

For instance, in the case of the method shown in FIG. 2C, the setting values of the plurality of sound record parameters are previously stored in the playback device 10. Therefore, after sound recording operation is performed by use of any of the sound record parameters, the sound record parameters can also be transmitted from the playback device 10 to the smartphone 12 and retained in the memory of the smartphone 12.

On the occasion of installation of a predetermined application in the smartphone 12, the application can also be downloaded from a specific site of the Internet 100, and a plurality of sound record parameters can also be downloaded along with the predetermined application. The setting values of the sound record parameters downloaded from the specific site are stored in the memory of the playback device 10 by means of the method shown in FIG. 2B. The plurality of sound record parameters can also be offered in advance by a manufacturer which creates a predetermined application, or offered at cost or without charge by the user who utilizes the system. Online electronic commerce of still images, moving images, music, books, and the like, is already known. However, according to the present embodiment, online electronic commerce pertaining to the setting values of the sound record parameters becomes feasible.

When sound record parameters used in recording the music accompany music data as meta data, the sound record parameters can also be extracted during downloading of the music data, and the thus-extracted sound record parameters can also be transmitted from the smartphone 12 to the playback device 10. In addition, the present embodiment illustrates the Wi-Fi connection as a wireless connection, but Bluetooth (Registered Trademark) connection can also be used.

In the present embodiment, as mentioned previously, the sound record parameters can be any of the sound recording level, the sound recording format, and a combination thereof. In the case of the combination, the sound record parameters are previously combined as a set and retained in large numbers in the memory of the playback device 10 or the smartphone 12. Even when a small number of sets of sound record parameters can be retained because of a limitation on the memory of the playback device 10, sound recording can be performed under various sound recording conditions, so long as a larger number of sets are retained in the memory of the smartphone 12. A desired set of sound record parameters can be selected, by way of the smartphone 12, from a plurality of sets of sound record parameters retained in the playback device 10. Alternatively, a desired set of sound record parameters can be selected from among a plurality of sets retained in the smartphone 12 and wirelessly sent to the playback device 10. For instance, Set 1, Set 2, Set 3, and Set 4 are retained in the memory of the smartphone 12 as a set of sound record parameters (including the sound recording format, the sampling frequency, the number of quantization bits, a sound recording level, a filter, a limiter, effects, and others), and the user selects Set 1 from the sets and wirelessly sends Set 1 to the playback device 1. As a matter of course, the combination of parameters making up the sound record parameter set can be fixed or selected accordingly by the user. For example, (a sound recording format and a sound recording level) are selected as a set of sound record parameters.

In the present embodiment, setting of the sound record parameters has been described. However, playback parameters can also be set likewise in place of or along with the sound record parameters by means of wireless transmission from the smartphone 12. In this case, the only requirement is to set a playback format, a playback level, and the like, as playback parameters individually or in the form of a set. Alternatively, a desired set can be selected, by the smartphone 12, from a plurality of sets of playback parameters retained in the playback device 10, or a desired set can be selected from the plurality of sets of playback parameters retained in the smartphone 12 and wirelessly transmitted to the playback device 10. Moreover, the set of playback parameters retained in the playback device 10 can also be adjusted by the smartphone 12 and wirelessly transmitted as adjusted setting values to the playback device 10. The set of playback parameters can also be stored along with a set of sound record parameters in the ROM 38 or the RAM 40 of the playback device 10 or stored in memory separate from the memory where the sets of sound record parameters are stored. Provided that the memory storing the sets of playback parameters is taken as second memory, the second memory may be identical with or different from the memory (the ROM 38 or the RAM) that stores the sound record parameters. When the predetermined application is installed in the smartphone 12, the application can be downloaded from the specific site of the Internet 100, or a plurality of playback parameters can also be downloaded along with the predetermined application. Incidentally, the present embodiment has described the case where the smartphone 12 and the playback device 10 are connected in a one-to-one relationship. However, as will be described later, when the smartphone 12 and the playback device 10 can be connected in a one-to-many relationship, the setting values of the sound record parameters and those of the playback parameters of the plurality playback devices 10 can be set collectively or arbitrarily by means of the smartphone 12 at hand.

Second Embodiment

Figure 4:
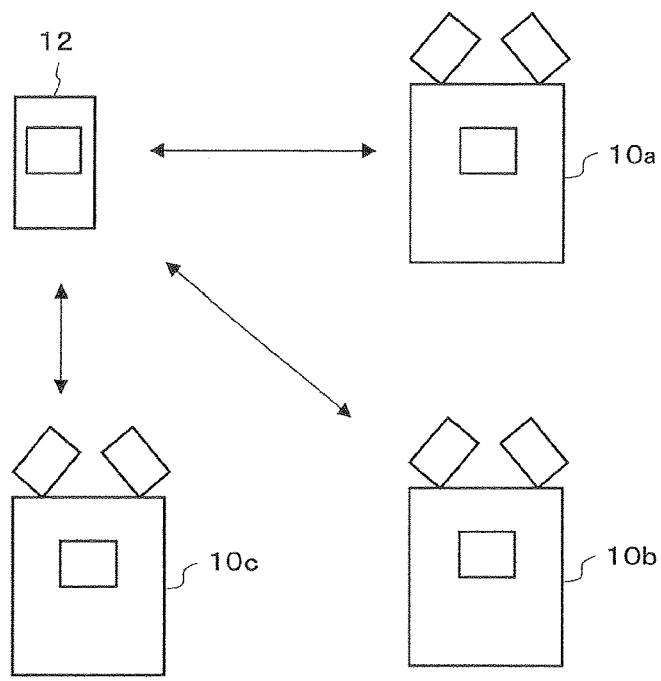
FIG. 4 is an overall configuration diagram of a second embodiment.

FIG. 4 is an overall configuration diagram of a second embodiment. A plurality of pieces of portable recording/reproducing apparatus (hereinafter referred to simply as "playback devices") 10a, 10b, and 10c wirelessly exchange data with a portable device having a wireless connection function. In the present embodiment, the smartphone 12 is mentioned as the portable device having the wireless connection function, and the wireless LAN, more specifically the Wi-Fi connection, is mentioned as the wireless connection. The smartphone having the Wi-Fi module has already been known and can be connected to the Internet by way of the access point of a wireless router, and others.

The playback devices 10a, 10b, and 10c are placed at mutually-different locations; have known recording and reproducing functions; process an audio signal input from the built-in microphone or the line input terminal and record the thus-processed audio signal into the recording medium, such as an SD card; and reproduce the audio signal recorded in the SD card and output the thus-reproduced audio signal from the built-in speaker. Each of the playback devices 10a, 10*b*, and 10*c* has the Wi-Fi module and establishes the Wi-Fi connection with the smartphone 12.

Incidentally, the playback devices 10*a*, 10*b*, and 10*c* are preferably connected to the smartphone 12 by means of the Wi-Fi connection. However, some of the smartphones 12 have only a function of a Wi-Fi client and in some cases cannot be connected to a plurality of Wi-Fi devices. In this case, any of the recording devices 10*a*, 10*b*, and 10*c*; for instance, the playback device 10*a*, and the smartphone 12 are connected by means of the Wi-Fi connection. The remaining playback devices 10*b* and 10*c* are connected to the playback device 10*a* by means of the Wi-Fi connection, thereby coming into indirect wireless connection with the smartphone 12. Such a topology will be further described later.

The playback devices 10*a*, 10*b*, and 10*c* input an audio signal generated by live performance of bands, etc., to the built-in microphone or an external microphone. The smartphone 12 transmits a control command to the respective playback devices 10*a*, 10*b*, and 10*c*, thereby remotely controlling a record start and a record stop. Moreover, the smartphone 12 receives the status information transmitted from the playback devices 10*a*, 10*b*, and 10*c*, and displays the thus-received status information on the screen. Consequently, as long as the user places the playback devices 10*a*, 10*b*, and 10*c* at respective desired locations before performance; for instance, live music performance, and operates the smartphone 12, the user can perform sound recording by remotely operating the playback devices 10*a*, 10*b*, and 10*c*. Further, by mere visual confirmation of the screen of the smartphone 12, the user can easily ascertain respective sound recording statuses from the status information about the playback devices 10*a*, 10*b*, and 10*c* and also adjust the sound record parameters, such as a sound recording level of a specific playback device, during sound recording by means of remote operation.

Figure 5:
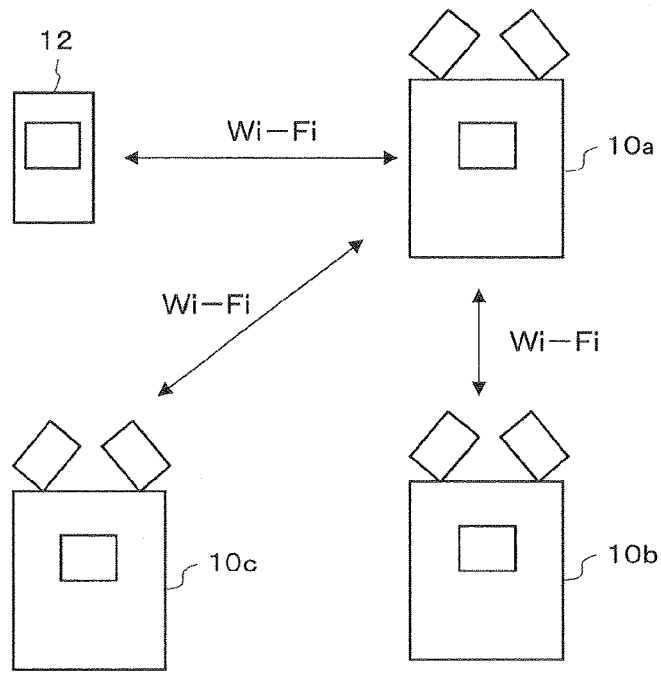
FIG. 5 is an overall configuration diagram of the second embodiment.

FIG. 5 is a diagram showing an example topology of the present embodiment. The smartphone 12 establishes a Wi-Fi connection by taking any of the playback devices 10*a*, 10*b*, and 10*c*; for instance, the playback device 10*a*, as an access point.

In the meantime, the playback devices 10*b* and 10*c* other than the playback device 10*a* set as the access points for the smartphone 12 are set as Wi-Fi clients and individually establish the Wi-Fi connection with the playback device 10*a*. Specifically, the playback device 10*b* establishes the Wi-Fi connection as the Wi-Fi client while taking the playback device 10*a* as the access point. The playback device 10*c* also establishes the Wi-Fi connection as the Wi-Fi client while taking the playback device 10*a* as the access point.

The playback device 10*a* manages IP addresses of the playback devices 10*b* and 10*c* while taking the playback devices 10*b* and 10*c* as clients, and also reports the IP addresses to the smartphone 12. The smartphone 12 designates the IP addresses of the playback devices 10*b* and 10*c* received from the playback device 10*a*, and transmits a command to the playback devices 10*b* and 10*c* byway of the playback device 10*a*. Thus, the smartphone 12 remotely, indirectly controls the playback devices 10*b* and 10*c* byway of the playback device 10*a*.

Alternatively, the user can arbitrarily set which one of the playback devices 10*a*, 10*b*, and 10*c* serves as an access point or a client. Further, switching between the access point and the client can also be manually performed. Switching between an access point mode and a client mode is already known in connection with a wireless LAN router, and the like. Each of the playback devices 10*a*, 10*b*, and 10*c* has a mode changeover switch, and the user manually sets the changeover switch.

The user can also manually set an IP address of each of wireless LAN devices made up of the smartphone 12 and the playback devices 10*a*, 10*b*, and 10*c*, or the IP addresses can also be automatically set. For instance, the playback device 10*a* that acts as an access point can have a DHCP function, and IP addresses of the smartphone 12 and the playback devices 10*b* and 10*c* can also be automatically imparted. In this case, the playback device 10*a* collectively provides the smartphone 12 with the IP addresses imparted by the DHCP function.

Figure 6:
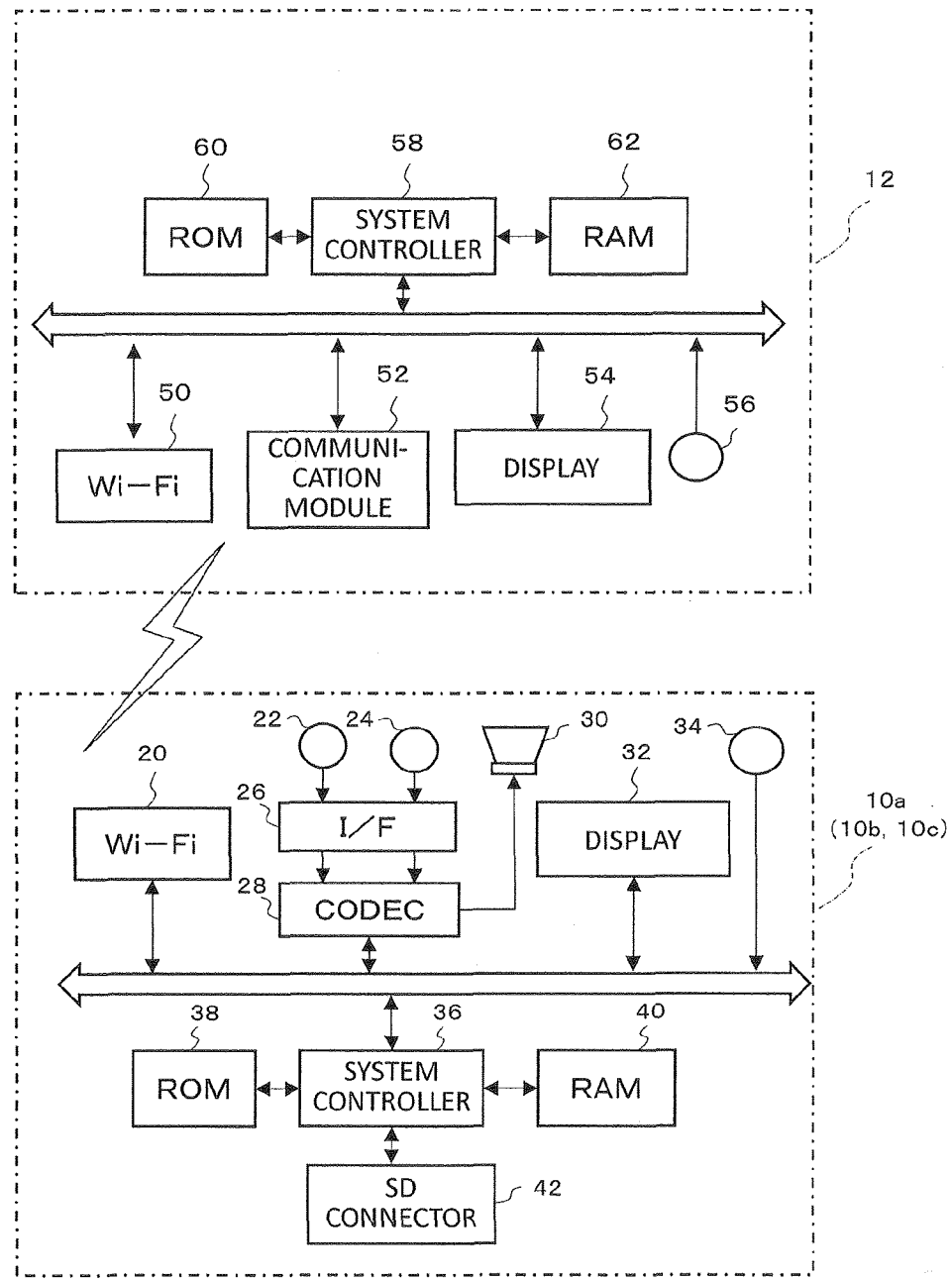
FIG. 6 is a block diagram of the system configuration of the second embodiment.

FIG. 6 is a block diagram of a system configuration of the present embodiment. For the sake of convenience in explanation, only the configuration block diagram of the playback device 10*a* and that of the smartphone 12 are illustrated. The playback devices 10*b* and 10*c* have the same configuration as that of the playback device 10*a*.

The playback device 10*a* is equipped with the Wi-Fi module 20, the built-in microphone 22, the line input terminal 24, the built-in speaker 30, the display 32, the operation buttons 34, the system controller 36, and the SD connector 42.

The Wi-Fi module 20 is a wireless LAN module that establishes the Wi-Fi connection and exchanges data with the smartphone 12. In response to operation of the operation buttons 34, the Wi-Fi module 20 starts up and establishes Wi-Fi connection with the smartphone 12. The Wi-Fi module 20 performs switching between the access point mode and the client mode in response to operation of the operation buttons 34. When set to the access point mode, the Wi-Fi module 20 establishes the Wi-Fi connection while taking the smartphone 12 as a client. Further, the Wi-Fi module 20 establishes the Wi-Fi connection while taking the playback devices 10*b* and 10*c* as clients.

The built-in microphone 22 is a stereo microphone having L and R channels and inputs an audio signal generated by playing a musical instrument, and the like, and outputs the audio signal to the interface (I/F) 26.

The line input terminal 24 allows line-input of the audio signal from the external device and outputs the audio signal to the interface (I/F) 26.

The interface (I/F) 26 outputs the audio signal from the built-in microphone 22 or the line input terminal 24 to the codec (CODEC) 28.

The codec (CODEC) 28 converts the input audio signal into a digital signal, subjects the digital signal to equalizer processing and effects processing including compression and encoding, and supplies the thus-processed signal to the system controller 36. Further, the audio signal supplied from the system controller 36 is expanded and decoded, converted into the analog audio signal, and output from the built-in speaker 30. The codec (CODEC) 28 can also separately have a module for processing the audio signal input from the built-in microphone 22 or the line input terminal 24, and another module for processing the audio signal output to the built-in speaker 30. The codec (CODEC) 28 can also have a plurality of processors and operate in cooperation with the PLD (programmable logic device).

The display 32 is made up of an LCD panel, an organic EL panel, or the like, and displays various types of status information about the playback device 10; for instance, a record/playback time counter and a recording level.

The operation buttons 34 are those used for instructing operation of the playback device 10. The operation buttons 34 include a Wi-Fi button used for switching a Wi-Fi connection between ON and OFF and switching between the access point mode and the client mode, a record/playback/stop button, a sound recording level adjustment button, a channel (track) selection button, and others. The operation buttons 34 can also be configured as a jog dial or touch buttons on the display 32.

The system controller 36 is made up of a processor and memory and controls individual sections of the playback device 10. In accordance with a processing program recorded in ROM 38, the system controller 36 performs various types of processing by using RAM 40 as working memory. Various types of processing include starting/stopping the Wi-Fi module 20, controlling switching between the access point mode and the client mode, establishing a connection between the Wi-Fi module 20 and another playback device, processing an audio signal input from the built-in microphone 22 or the line input terminal 24, recording the audio signal into the SD card, reproducing the audio signal, and others. The ROM 38 stores an access point program used for letting the Wi-Fi module act in an access point mode and a client program for letting the Wi-Fi module act in a client mode. The system controller 36 reads the program in response to switching operation of the operation buttons 34, thereby letting the playback device 10a operate in an access point mode or a client mode. The system controller 36 can also include a plurality of processors and work in coordination with the PLD (programmable logic device). The system controller 36 can also work as the codec (CODEC) 28, and the codec (CODEC) 28 and the system controller 26 can also be integrated together.

An SD card is inserted into the SD connector 42. The system controller 36 performs sound recording operation by recording the audio signal into the SD card. In addition, the system controller 36 reads the audio signal recorded in the SD card, outputting the thus-read audio signal from the built-in speaker 30 by way of the codec (CODEC) 28.

When the operation buttons 34 are switched to the access point mode, the Wi-Fi module 20 receives various commands from the smartphone 12 and transfers the commands received from the smartphone 12 to a playback device of the corresponding IP address. Further, the Wi-Fi module 20 transmits its own status information to the smartphone 12 and also transfers the status information received from another playback device to the smartphone 12.

Further, when the operation buttons 34 are switched to the client mode, the Wi-Fi module receives a command from the playback device set to the access point, and also transmits its own status information to the playback device set to the access point.

Meanwhile, the smartphone 12 has a Wi-Fi module 50, a communication module 52, a display 54, operation buttons 56, and a system controller 58.

The Wi-Fi module 50 is a wireless LAN module that establishes a Wi-Fi connection with and exchanges data with the playback device 10a. In response to operation of the operation buttons 56, the Wi-Fi module 50 establishes the Wi-Fi connection with the playback device 10.

The communication module 52 exchanges data over the telephone line.

The display 54 is made up of an LCD panel, an organic EL panel, or the like, and displays various types of status information about the smartphone.

The operation buttons 56 are those used for instructing operation of the smartphone 12. The operation buttons 56 include the Wi-Fi button used for switching the Wi-Fi connection between ON and OFF and switching among known phone functions. The operation buttons 56 can also be configured from a touch panel.

The system controller 58 is made up of a processor and memory and controls the individual sections of the smartphone 12. In accordance with a processing program recorded in ROM 60, the system controller 58 performs various types of processing by using RAM 62 as working memory. Various types of processing include starting/stopping the Wi-Fi module 50, establishing the connection with the playback device 10, exchanging various commands, receiving the status information, and displaying the status information. The system controller 58 can also include a plurality of processors and work in coordination with the PLD (programmable logic device).

The system controller 58 establishes the Wi-Fi connection with the playback device 10a switched and set to the access point mode, and transmits various commands. The commands include a destination IP address, a command for the playback device 10a, a command for the playback device 10b, and a command for the playback device 10c. The system controller 58 also receives the status information from the playback 10a and displays the thus-received status information on the display 54. The status information received from the playback device 10 includes status information about the playback device 10b and status information about the playback device 10c. The system controller 58 switches the status information as necessary or collectively displays the status information on the display 54.

In the present embodiment, each of the playback devices 10a, 10b, and 10c has as the operation button 34 a changeover switch for switching between the access point mode and the client mode. The playback devices 10a, 10b, and 10c can also establish a communication with each other within a range of wireless communication, thereby automatically setting any one of the playback devices as an access point. For instance, Japanese Unexamined Patent Application Publication No. 2006-352188 discloses a wireless LAN communication device. The wireless communication device has an access point function section capable of operating as an access point of the wireless LAN, a client function section capable of operating as a client of the wireless LAN, a changeover section for letting the access point function section or the client function section operate in a switching manner, an acquisition section, and a determination section. In a case where the changeover section causes the access point function section to operate, when the access point function section detects a device, which operates as the access point of the wireless LAN, within a predetermined range centering on the wireless LAN communication device, the acquisition section acquires wireless LAN identification information about a device from the thus-detected device. The determination section determines whether or not the thus-acquired wireless LAN identification information about a device and the wireless LAN identification information about the wireless LAN communication device coincide with each other. When the determination section determines that a match exists between the pieces of identification information, the changeover section switches the access point function section, thereby activating the client function section. Such a technique can also be used. However, such a technique is illustrative and not indispensable.

Figure 7A:
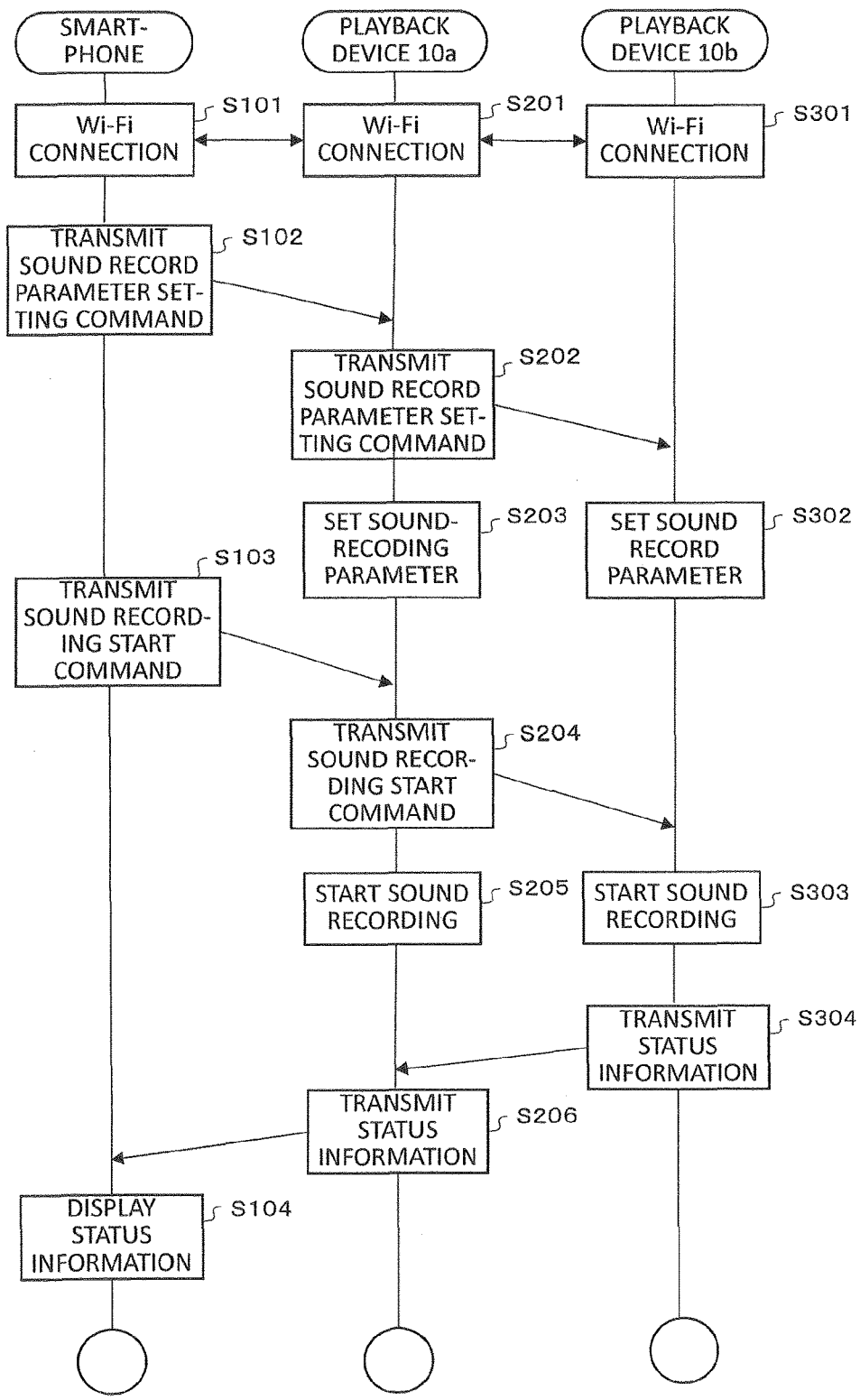
FIG. 7A is a processing flow diagram of the second embodiment (Part 1)
Figure 7B:
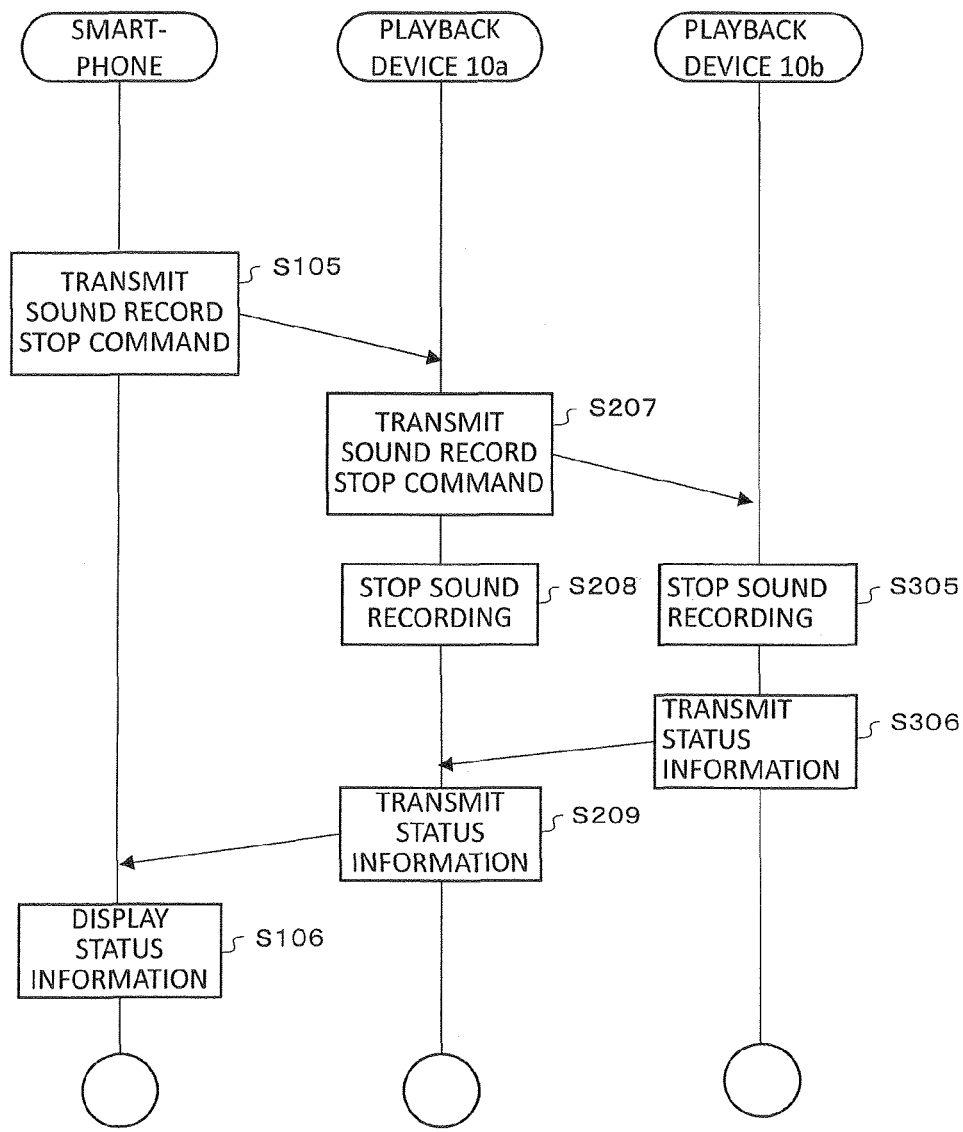
FIG. 7B is a processing flow diagram of the second embodiment (Part 2)

FIG. 7A and FIG. 7B are processing flowcharts of the present embodiment. For the sake of convenience in explanation, only the smartphone 12 and the playback devices 10a and 10b are illustrated. In the illustrated case, the playback device 10a acts as an access point, and the playback device 10b acts as a client.

First, the Wi-Fi connection is established between the smartphone 12 and the playback device 10a and between the playback devices 10a and 10b (S101, S201, and S301). For instance, the user manually sets the playback device 10a as an access point, and the playback device 10b is automatically set as a client by means of a communication with the playback device 10a. The smartphone 12 establishes the Wi-Fi connection while taking the playback device 10a as an access point. The smartphone 12 and the playback devices 10a and 10b make up one wireless LAN and share the same SSID. After configuration of the wireless LAN, the smartphone 12 transmits a wireless LAN packet to search for the playback devices 10a and 10b that make up the wireless LAN. In accordance with the wireless LAN packet, the playback device 10a transmits an IP address set on itself to the smartphone 12. Further, the playback device 10a transmits the packet to the playback device 10b, and relays to the smartphone 12 an IP address of the playback device 10b returned from the playback device 10b in response to the packet. The smartphone 12 stores the thus-received IP addresses of the playback devices 10a and 10b into memory (RAM 62). The playback device 10b also stores the IP address of the smartphone 12 and the IP address of the playback device 10a into the memory.

Next, the smartphone 12 sets the playback devices 10a and 10b as destination IP addresses, and wirelessly transmits a sound record parameter setting command to the playback device 10a (S102).

The playback device 10a receives the command transmitted from the smartphone 12, and relays to the playback device 10b the packet of the playback device 10b that is the destination IP address (S202). On the basis of the setting command included in the packet whose destination IP address is the playback device 10a, the playback device 10a sets sound record parameters (S203).

Moreover, the playback device 10b receives the command transmitted from the playback device 10a, and sets the sound record parameters on the basis of the setting command included in the packet whose destination IP address is the playback device 10b (S302). The sound record parameters are parameters for specifying various sound recording conditions and include the sound recording format, the sampling frequency, the number of quantization bits, the sound recording level, the filter, the limiter, the effects, and others. In addition to transmitting a command for setting the same sound record parameter set to the playback devices 10a and 10b, the smartphone 12 can also transmit a command for setting a different sound record parameter set to each of the playback devices 10a and 10b. For instance, a command for setting the following is transmitted to the playback device 10a.

Sound recording format: "a" format,
Sampling frequency: fa kHz,
The number of quantization bits: "a" bits,
Sound recording level: "a" level,
Filter: "a" filter,
Limiter: "a" limiter, and
Effects: "a" effect.

A command for setting different conditions is sent to the playback device 10b.

Sound recording format: "b" format,
Sampling frequency: fb kHz,
The number of quantization bits: "b" bits,
Sound recording level: "b" level,
Filter: "b" filter,
Limiter: "b" limiter, and
Effects: "b" effect.

As a matter of course, one or a plurality of parameters that make up the set can also be set instead of setting the sound record parameter set. For instance, only a sound recording level is set.

A plurality of sound record parameter sets are previously stored in the memory of the smartphone 12, and the user selects the sound record parameter set for each of the playback devices 10a and 10b and transmits the thus-selected sound record parameter.

After setting the sound record parameter, the smartphone 12 sets the playback devices 10a and 10b as destination IP addresses, and wirelessly transmits a sound recording start command to the recording playback device 10b (S103).

The playback device 10a receives the command transmitted from the smartphone 12, and relays to the playback device 10b the packet whose destination IP address is the playback device 10b(S204). In accordance with a sound recording command included in the packet whose destination IP address is the playback device 10b, the playback device 10b initiates sound recording operation (S205).

Further, the playback device 10b receives a command transmitted from the playback device 10a and starts sound recording operation on the basis of the sound recording start command included in the packet whose destination IP address is the playback device 10b (S303).

The playback device 10a transmits to the smartphone 12 recording-in-operation status information; specifically, a time count value and a sound recording level (S206).

The playback device 10b transmits to the playback device 10a the recording-in-operation information while setting the destination IP address to the smartphone 12 (S304). The playback device 10a relays to the smartphone 12 the packet received from the playback device 10b (S206).

The smartphone 12 displays on the display 54 the status information about the playback device 10a received from the playback device 10a and the status information about the playback device 10b (S104).

Next, in FIG. 7B, when music performance to be recorded, or the like, ends, the smartphone 12 sets the playback devices 10a and 10b as destination IP addresses, and wirelessly transmits a record stop command to the playback device 10a (S105).

The playback device 10a receives the command transmitted from the smartphone 12, and relays to the playback device 10b the packet whose destination IP address is the playback device 10b (S207). On the basis of the record stop command included in the packet whose destination IP address is the playback device 10b, the playback device 10b stops recording (S208).

Additionally, the playback device 10b receives the command transmitted from the playback device 10a and stops sound recording operation in accordance with the record stop command included in the packet whose destination IP address is the playback device 10b (S305).

The playback device 10a transmits status information; specifically, the record stop information, to the smartphone 12 (S209).

The playback device 10b transmits the status information to the playback device 10a while setting the destination IP address on the smartphone 12 (S306). The playback device 10a relays to the smartphone 12 the packet received from the playback device 10b (S209).

The smartphone 12 displays on the display 54 the status information (record stop information) about the playback device 10a received from the playback device 10a and the status information (record stop information) about the playback device 10b (S106).

Figure 8:
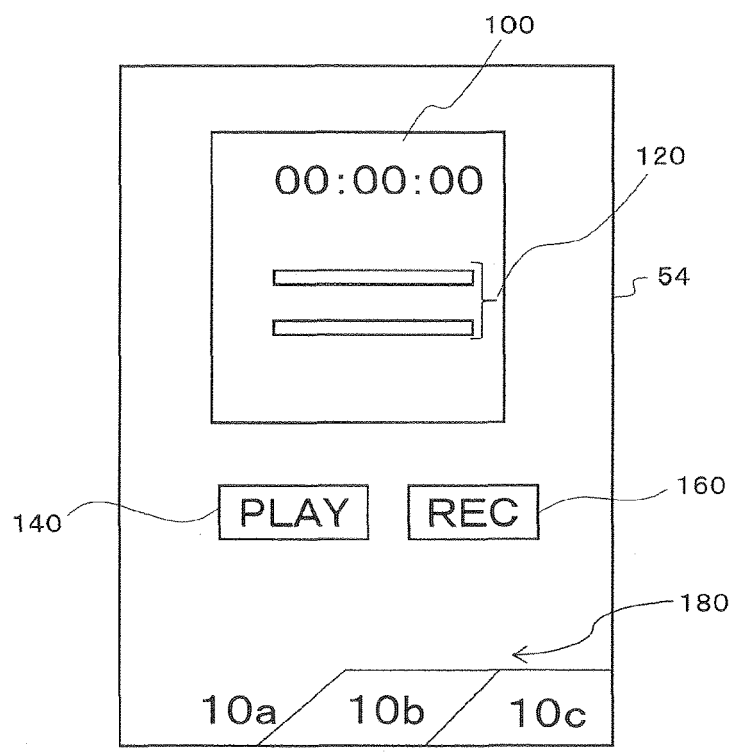
FIG. 8 is an explanatory view of a smartphone's screen of the second embodiment.

FIG. 8 is an example of status information to be displayed on the display 54 of the smartphone 12. Status information about the playback devices 10*a*, 10*b*, and 10*c* can be selectively switched by tabs 180 displayed in a lower region of the display 54. A time counter 100 and a sound recording level 120 (a numeral and a bar graph) are displayed as status information. Moreover, a playback button 140 and a record button 160 are displayed as menus. In addition to these, a record stop button can also be displayed. The user can easily ascertain the sound recording level by visually confirming the status information about each of the playback devices 10*a*, 10*b*, and 10*c*. Further, when the user desires to adjust the sound recording level of any of the playback devices, the user can also perform adjustment by transmitting a sound record parameter setting command.

Figure 9:
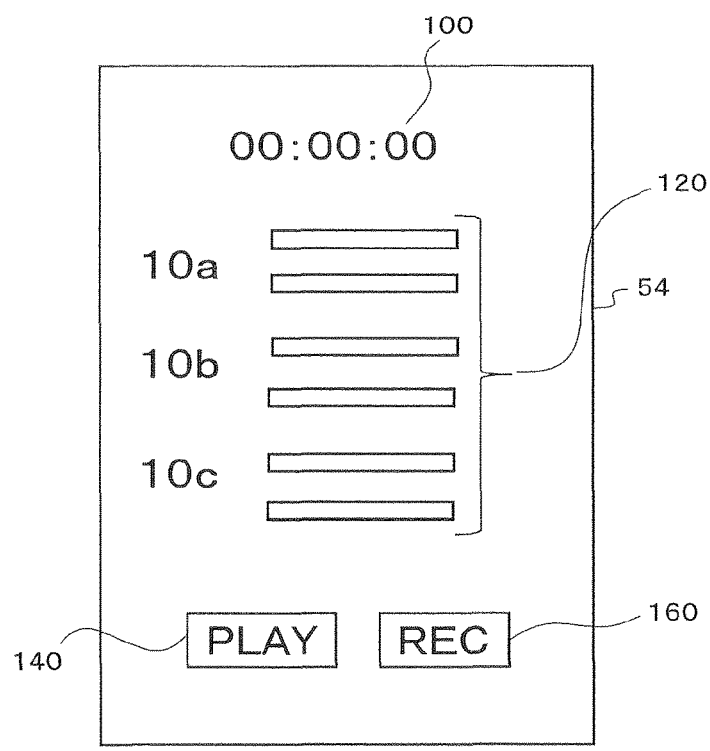
FIG. 9 is another explanatory view of the smartphone's screen of the second embodiment.

FIG. 9 is another example of the status information displayed on the display 54 of the smartphone 12. The time counters 100 and the sound recording levels 120 of the playback devices 10*a*, 10*b*, and 10*c* are collectively displayed. The user can easily ascertain the sound recording levels of all the playback devices by visually confirming the screen.

The present embodiment has described the case where the smartphone 12 and the playback device can be connected in a one-to-one relationship. However, when the smartphone 12 can be connected directly to the playback devices 10*a*, 10*b*, and 10*c* in a one-to-many relationship, all the user needs to do is to set the smartphone 12 as an access point, switch all of the playback devices 10*a*, 10*b*, and 10*c* to the client mode, transmit the command to each of the playback devices 10*a*, 10*b*, and 10*c* from the smartphone 12, receive the status information from each of the playback devices 10*a*, 10*b*, and 10*c*, and display the thus-received status information on the display 54. When a predetermined application (an application required to monitor or control the playback device 10) installed in the smartphone 12 is initiated and set as the "access point" or "dithering," the predetermined application can transmit a command to the playback devices 10*a*, 10*b*, and 10*c*, and the playback devices 10*a*, 10*b*, and 10*c* can automatically be switched to the client mode in response to the command. Alternatively, the playback devices 10*a*, 10*b*, and 10*c* can be set in a client mode as a default. When a specific command is not transmitted from the smartphone 12, any of the playback devices 10*a*, 10*b*, and 10*c* can be switched to the access point mode, and remaining playback devices can be maintained without change in the client mode.

Although the present embodiment illustrates the Wi-Fi connection as wireless connection, Bluetooth (Registered Trademark) or the like can also be employed.

The invention claimed is:

1. A portable recording/reproducing apparatus comprising:
 a wireless local area network (LAN) module which, in operation, when the wireless LAN module and a portable device are wirelessly connected, receives from the portable device a request for a plurality of current setting values of sound recording parameters set in the portable recording/reproducing apparatus, transmits to the portable device the current setting values of sound recording parameters set in the portable recording/reproducing apparatus, and receives from the portable device a plurality of adjusted setting values of sound recording parameters, at least one of the current setting values specifying a sound recording format to be used to record an audio signal;
 an input which, in operation, inputs the audio signal; and
 a processor which, in operation, records the audio signal in a recording medium using the adjusted setting values of the sound recording parameters received by the wireless LAN module,
 wherein, when the at least one of the adjusted setting values specifies that a wav format is to be used to record the audio signal, the processor records the audio signal in the recording medium according to the wav format, and
 wherein, when the at least one of the adjusted setting values specifies that an mp3 format is to be used to record the audio signal, the processor records the audio signal in the recording medium according to the mp3 format.

2. The portable recording/reproducing apparatus according to claim 1, wherein
 when the wireless LAN module and the portable device are wirelessly connected, the wireless LAN module receives setting values of playback parameters wirelessly transmitted from the portable device and the processor reproduces the audio signal using the received setting values of the playback parameters.

3. A portable recording/reproducing apparatus comprising:
 a wireless local area network (LAN) module which, in operation, when the wireless LAN module and a portable device are wirelessly connected, receives from the portable device a request for a plurality of setting values of sound recording parameters set in the portable recording/reproducing apparatus, transmits to the portable device the setting values of sound recording parameters set in the portable recording/reproducing apparatus, and receives from the portable device a selection command;
 an input which, in operation, inputs an audio signal;
 a memory which, in operation, stores a plurality of setting values of sound recording parameters, at least one of the setting values specifying a sound recording format to be used to record the audio signal; and
 a processor which, in operation, records the audio signal in a recording medium using the setting values of the sound recording parameters stored in the memory selected using the selection command wirelessly received by the wireless LAN module,
 wherein, when the at least one of the setting values specifies that a wav format is to be used to record the audio signal, the processor records the audio signal in the recording medium according to the wav format, and
 wherein, when the at least one of the setting values specifies that an mp3 format is to be used to record the audio signal, the processor records the audio signal in the recording medium according to the mp3 format.

4. The portable recording/reproducing apparatus according to claim 3, further comprising:
 a second memory which, in operation, stores a plurality of setting values of playback parameters,
 wherein when the wireless LAN module and the portable device are wirelessly connected, the processor reproduces the audio signal using one or more of the setting values of playback parameters selected using a second selection command wirelessly transmitted from the portable device.

5. A portable recording/reproducing apparatus comprising:
 a wireless local area network (LAN) module which, in operation, when the wireless LAN module and a portable device are wirelessly connected, receives from the portable device a request for a plurality of setting values of sound recording parameters set in the portable recording/reproducing apparatus, transmits to the portable device the setting values of sound recording parameters set in the portable recording/reproducing apparatus, and receives from the portable device a command;

an input which, in operation, inputs an audio signal;

a memory which, in operation, stores a plurality of setting values of sound recording parameters, at least one of the setting values specifying a sound recording format to be used to record an audio signal; and a processor which, in operation, records the audio signal in a recording medium using the setting values of the sound recording parameters in response to the command wirelessly received by the wireless LAN module, causes the wireless LAN module to wirelessly transmit the setting values to the portable device, receives adjusted setting values wirelessly transmitted from the portable device, and records the audio signal by use of the received, adjusted setting values, wherein, when the at least one of the setting values specifies that a wav format is to be used to record the audio signal, the processor records the audio signal in the recording medium according to the wav format, and wherein, when the at least one of the setting values specifies that an mp3 format is to be used to record the audio signal, the processor records the audio signal in the recording medium according to the mp3 format.

6. The portable recording/reproducing according to claim 5, further comprising a second memory which, in operation, stores a plurality of setting values of playback parameters, wherein the processor, in operation, reads the setting values of the playback parameters recorded in the second memory in response to a second command wirelessly transmitted from the portable device when the wireless LAN module and the portable device are wirelessly connected, causes the wireless LAN module to wirelessly transmit the setting values of the playback parameters to the portable device, receives adjusted setting values of the playback parameters wirelessly transmitted from the portable device, and reproduces the audio signal using the received, adjusted setting values of the playback parameters.

7. A recording/reproducing system comprising:
a portable device; and
a portable recording/reproducing apparatus, wherein the portable recording/reproducing apparatus includes:
a wireless local area network (LAN) module which, in operation, when the wireless LAN module and the portable device are wirelessly connected, receives from the portable device a plurality of current setting values of sound recording parameters set in the portable recording/reproducing apparatus, transmits to the portable device the current setting values of sound recording parameters set in the portable recording/reproducing apparatus, and receives from the portable a plurality of adjusted setting values of sound recording parameters, at least one of the current setting values specifying a sound recording format to be used to record an audio signal;

an input which, in operation, inputs an audio signal; and a processor which, in operation, records the audio signal in a recording medium using the adjusted setting values of the sound recording parameters received by the wireless LAN module, wherein, when the at least one of the adjusted setting values specifies that a wav format is to be used to record the audio signal, the processor records the audio signal in the recording medium according to the wav format, and wherein, when the at least one of the adjusted setting values specifies that an mp3 format is to be used to record the audio signal, the processor records the audio signal in the recording medium according to the mp3 format.

8. The recording/reproducing system according to claim 7, wherein, when the wireless LAN module and the portable device are wirelessly connected, the wireless LAN module receives a plurality of setting values of playback parameters wirelessly transmitted from the portable device and the processor reproduces the audio signal by use of the received setting values of the playback parameters.

9. The recording/reproducing system according to claim 7, wherein the portable device acquires the setting values by way of the Internet.

* * * * *